(12) United States Patent
Orsley

(10) Patent No.: US 8,605,960 B2
(45) Date of Patent: Dec. 10, 2013

(54) FINGERPRINT SENSING DEVICE

(75) Inventor: Timothy James Orsley, San Jose, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 785 days.

(21) Appl. No.: 12/396,285

(22) Filed: Mar. 2, 2009

(65) Prior Publication Data

US 2010/0220900 A1    Sep. 2, 2010

(51) Int. Cl.
*G06K 9/00* (2006.01)

(52) U.S. Cl.
USPC ............................................. 382/124

(58) Field of Classification Search
USPC ................... 356/124; 382/124, 321
See application file for complete search history.

(56) References Cited

U.S. PATENT DOCUMENTS

| | | | |
|---|---|---|---|
| 6,355,937 B2 | 3/2002 | Antonelli et al. | |
| 7,030,860 B1* | 4/2006 | Hsu et al. | 345/173 |
| 7,099,496 B2 | 8/2006 | Benkley | |
| 7,200,250 B2* | 4/2007 | Chou | 382/124 |
| 7,274,808 B2 | 9/2007 | Baharav et al. | |
| 7,274,836 B1 | 9/2007 | Chien | |
| 7,381,941 B2 | 6/2008 | Cheng et al. | |
| 2005/0244039 A1* | 11/2005 | Geoffroy et al. | 382/126 |
| 2007/0122013 A1 | 5/2007 | Setlak et al. | |
| 2009/0226052 A1* | 9/2009 | Fedele et al. | 382/125 |
| 2010/0208953 A1* | 8/2010 | Gardner et al. | 382/124 |
| 2010/0284565 A1* | 11/2010 | Benkley et al. | 382/103 |

* cited by examiner

*Primary Examiner* — Tarifur Chowdhury
*Assistant Examiner* — Jonathan Hansen

(57) ABSTRACT

A fingerprint sensing module for a touch screen device. The fingerprint sensing module includes a sensor, a light source, a motion detector, and an image processor. The sensor sets to capture portions for a fingerprint image as a finger is slid over the sensor. The motion detector determines a rate of the finger movement as the finger is slide over the touch screen device. The image processor reads fingerprint images from the sensor and the fingerprint motion data from the motion detector. The image processor subsequently combines portions of the fingerprint images into a complete fingerprint in accordance with the rate of the finger's movement.

17 Claims, 4 Drawing Sheets

FINGERPRINT SENSING DEVICE

BACKGROUND OF THE INVENTION

Fingerprint sensing devices have been widely used for security systems and fingerprint authentication. A typical fingerprint sensing device includes some form of a sensor for generating a representation of a fingerprint of a finger that is placed over or in direct contact with the sensor. In general, fingerprint detection methods may be capacitive, thermal, optical and ultrasonic; wherein the sensor captures the fingerprint image when a finger is either statically placed on the surface of the sensor or slid over the sensor surface.

More recently, electronic devices such as computers, and portable electronic devices like cell phones, have incorporated a fingerprint detector for individual authentication for security and data protection. For such devices, a main challenge is the size of the sensor, since it is more desirable to have a sensor with a small footprint. In addition, product reliability and system robustness are also key requirements.

In some conventional embodiments, capacitive based fingerprint sensing devices have been widely implemented. A capacitive based fingerprint sensing device may include a two dimensional electrode array which creates a capacitance between each electrode on the substrate and a grounded finger that is placed on the surface of the array. A two dimensional capacitance map of the pattern of ridges of the finger representing the fingerprint image is produced. However, a disadvantage of such approach is that the die size of the capacitive based sensor must be large enough to provide sufficient contact area for the finger to touch; therefore it is not an ideal candidate for use on a small sized handheld device which provides only a limited allowable foot print. Another drawback of such a capacitive based sensor is the issue of electrostatic discharge or ESD. The electrostatic discharge from the human body through the finger can damage the electrode. Additionally, it can be a challenge in acquiring a good quality image when the dryness or moisture level of the finger surface varies; the degree of moisture on the finger surface can cause the fingerprint recognition system to output erroneous results.

In another conventional embodiment, a fingerprint sensing device may consist of a linear array capacitive image sensor, a capacitive based rate sensor, and a sensor circuit for processing a fingerprint image when a finger is placed in direct contact with the capacitive sensor. The rate sensor is incorporated to sense the speed of the finger and provides rate drive signals to the sensor circuit and further combines image signals and rate signals to generate a fingerprint image. Since such system is based on the capacitive method, most of the above mentioned limitations which are associated with capacitive type sensor devices are unavoidable.

Another conventional optical fingerprint sensing device is known to utilize light reflected from a surface of a finger placed on an image sensing module to obtain finger print images. This image sensing device detects the movements of the finger, captures multiple fingerprint images, and subsequently processes these images to generate a complete finger print image. Accordingly, such an approach employs complicated image processing methods and requires high processing power in order to obtain an image quality needed to generate a useful fingerprint image for enabling fingerprint authentication. Alternatively, other conventional optical type fingerprint sensing devices may include an extra finger movement detector; for example, an optical image sensing module with a movement detecting function such as a roller has also been introduced. However, due to the large size of such module, complexity in its structure and lack of product robustness, such method is not suitable for assembly on a small size portable electronics device.

SUMMARY OF THE INVENTION

Embodiments of a fingerprint sensing device are described. In one embodiment, the fingerprint sensing device is a fingerprint sensing module for a touch screen device. Such a fingerprint sensing device includes a sensor, a light source, a capacitive based motion detector and an image processor. The sensor and the motion detector are coupled to the image processor. The image processor is configured to process at least two captured portions of the fingerprint image and further generating a processed fingerprint image in accordance with the finger movement determined by the motion detector. In an alternative embodiment, the finger sensing device includes a motion detector which is disposed within the touch screen device. The motion detector comprising a capacitive sensing element which is coupled with a motion computing circuit, whereby the motion computing circuit determines the finger movement or displacement as the finger is slid over the capacitive sensing element. Embodiments of the fingerprint sensing device facilitate an integrated fingerprint sensing solution to provide electronic devices such as computers, portable electronic devices like cell phones with individual authentication from the aspect of security and data protection.

Embodiments of a method are also described. One embodiment of the method includes emitting illumination light onto a finger that is slid over a touch screen of a finger print sensing device, capturing portions of a fingerprint image as the finger is slid over the sensor, detecting movement of the finger as the finger is in contact with a capacitive sensing element of the touch screen device, and generating a finger print image by processing at least two portions of finger print image captured by the sensor and in accordance with a rate of the finger's movement over the touch screen device. The method also includes computing the finger's movement by a motion computing circuit as the finger is slid over the capacitive sensing element that is operably disposed within the touch screen device, wherein the processor processes at least two portions of the fingerprint image and subsequently combining the two portions of the fingerprint image in correspondence to the detected finger's movement.

BRIEF DESCRIPTION OF THE DRAWINGS

Throughout the description, similar reference numbers may be used to identify similar elements.

DETAILED DESCRIPTION

Figure 1:
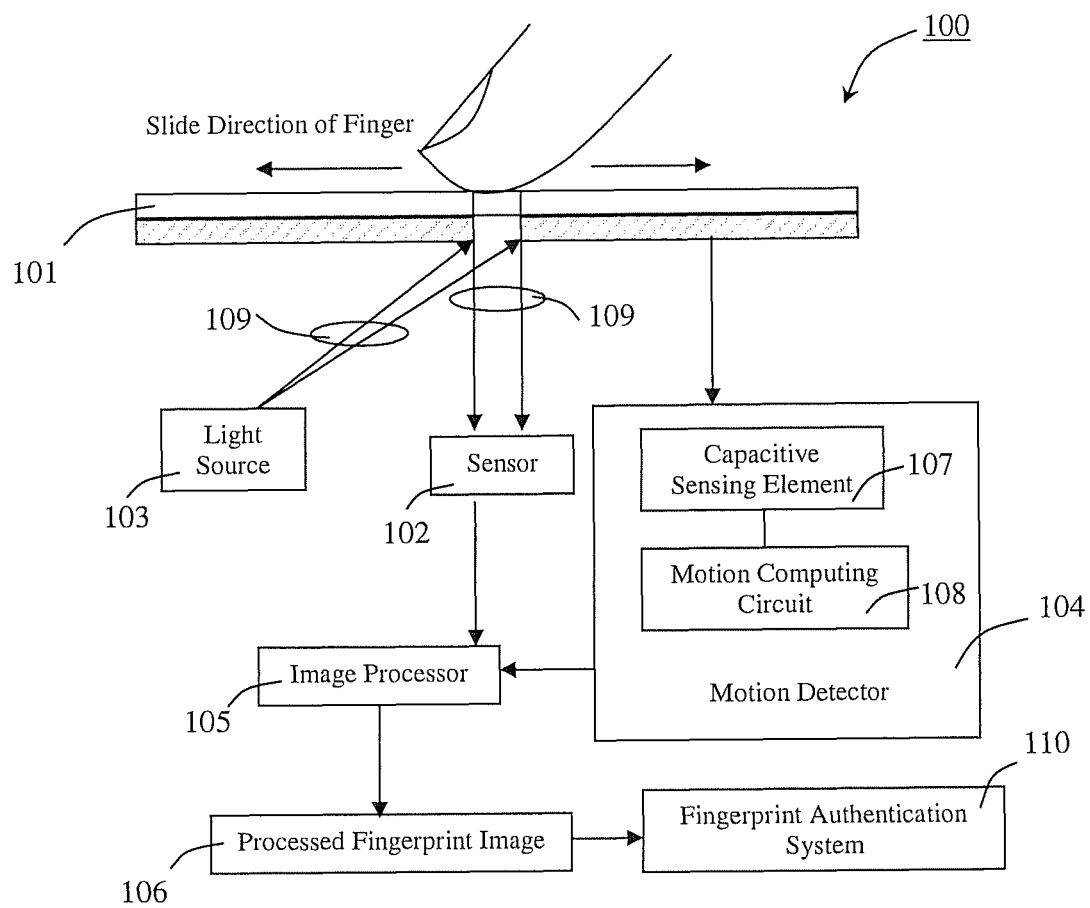
FIG. 1 depicts a schematic block diagram of one embodiment of a fingerprint sensing device.

FIG. 1 depicts a schematic block diagram of one embodiment of a fingerprint sensing device 100 with a touch sensitive surface 101 for users to place or slide a finger over the touch sensitive surface 101 for subsequently generating a fingerprint image. In one embodiment, the fingerprint sensing device 100 includes a sensor 102, a light source 103, a capacitive based motion detector 104 and an image processor 105. Although certain components or elements are illustrated in conjunction with the fingerprint sensing device 100 of FIG. 1, other embodiments may include more or fewer components, or any equivalent components which is capable of providing a similar or even a more complex fingerprint sensing function. For example, some embodiments of fingerprint sensing device may include a circuitry embedded therein and or incorporated within the sensor to process the fingerprint image and at the same time may provide other function such as optical finger navigation as will be appreciated by those skilled in the art. As another example, some embodiments of the fingerprint sensing device may employ an advanced optical lens system for directing the fingerprint image unto the sensor efficiently, whereas some fingerprint sensing devices may even function effectively without the deployment of any optical lens system.

The illustrated fingerprint sensing device 100 is mounted on a handheld device such as cell phone with a touch sensitive surface 101 upon which users place or slide a finger. In one embodiment, the sensor 102 and the motion detector 104 are coupled to the image processor 105. The image processor 105 receives fingerprint image portions from the sensor 102 and the finger movement information from the motion detector 104. The image processor 105 is configured to process at least two captured fingerprint image portions from the sensor 102 and subsequently generate a processed fingerprint image 106 in accordance with the finger movement determined by the motion detector 104.

The motion detector 104 has a capacitive sensing element 107 coupled to a motion computing circuit 108 for providing the finger movement information to the image processor 105. The motion computing circuit 108 is configured to determine or calculate the rate of finger movement or displacement of the finger as the finger is slid over the capacitive sensing element 107. The capacitive sensing element 107 will sense the position or movement of the finger as the finger is sliding across or in contact with the capacitive sensing element 107. The computing circuit 108 will subsequently determine the movement of the finger based on the various positions of the finger that is in contact with the capacitive sensing element 107. The fingerprint sensing device 100 is configurable to capture fingerprint image when the finger is slid over the touch sensitive surface 101 in any sliding direction or in a predetermined sliding manner. In addition, the motion detector 104 is also configurable to capture the fingerprint movement at any rate as long as a desirable valid finger print image is attainable by the sensor 102.

In one embodiment, the fingerprint sensing device 100 is used in conjunction with a touch screen handheld device such as cell phone. The handheld device may include a touch sensitive surface 101 which forms a part of the housing. Typically, a capacitive sensing element 107 is disposed within the touch sensitive surface 101 to enable the user to manipulate functions of the cell phone by touching the screen of the device. The touch sensitive surface 101 can also be utilized as a motion detector 104 when the touch sensitive surface 101 is coupled with an additional motion computing circuit 108. The capacitive sensing element 107 will sense the positions of the finger as the finger is slid across the capacitive sensing element 107 and the motion computing circuit 108 will subsequently determine the movement of the finger based on the various positions for the finger that is in contact with the capacitive sensing element 107. The touch sensitive surface 101 can be of a glass or plastic material which is generally used in a typical touch screen handheld device. Of course, the capacitive element 107 that is disposed within the touch sensitive surface 101 may cover the entire area of the touch sensitive surface 101 or it may cover only a specific region or a certain designated region of a screen. The fingerprint sensing device 100 of a touch screen handheld device can deploy the existing touch sensitive surface 101 as a finger movement detector 104; and therefore by incorporating an additional image sensor 102 and image processor 105, the handheld device can be used as fingerprint sensing device 100.

In general, the type of capacitive measuring method that is widely adopted in a handheld device may include self capacitance or mutual capacitance methods. Some of the known advantages of these methods include the accuracy and consistency in the discrimination between sliding motions or any multiple touches on the touch sensitive surface. Other advantages may also include highly responsive and sensitive areas provided by the touch surface. However, such characteristics and advantages of capacitive sensing elements have been widely known and discussed extensively in many prior publications.

The illustrated fingerprint sensing device 100 in FIG. 1 includes a light source 103, wherein the light source 103 illuminates a portion of the fingerprint as the finger is slid over the fingerprint sensing device 100. The reflected fingerprint image is then received through the optical element 109 and detected by the sensor 102. The light source 103 can be any suitable source of electromagnetic radiation such as a light emitting diode (LED), and may include a coherent or non-coherent LED. In another example, the light source 103 can be a single LED or multiple LEDs arranged to illuminate the fingerprint at a desirable intensity. The wavelength of the light source 103 can be selected from blue light to red light range and may include either visible or non-visible light (e.g. IR LED), as long as the selected light source 103 can adequately illuminate the fingerprint.

Figure 2:
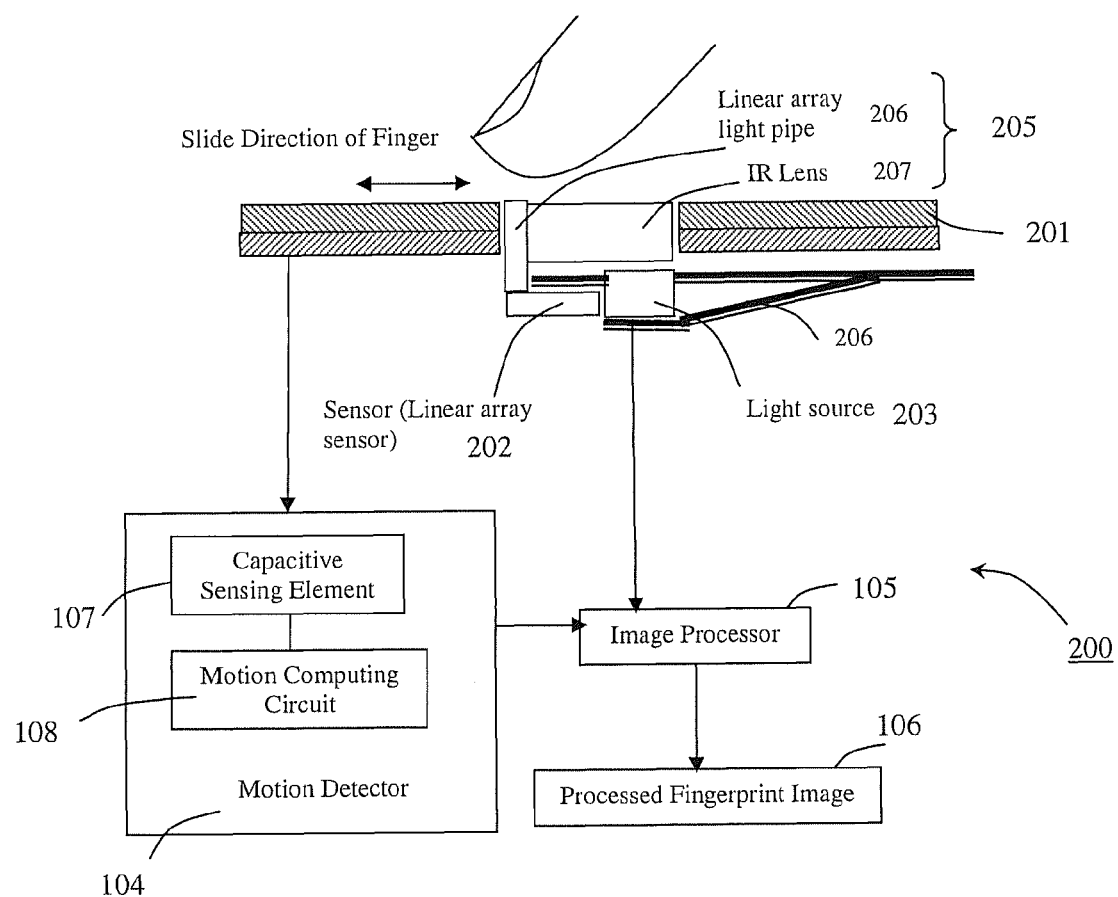
FIG. 2 shows a side view of one embodiment of a fingerprint sensing module for use in a handheld device.

As previously stated, the sensor 102 can be configured to capture portions of the fingerprint image as the finger is slid over the sensor 102; wherein the sensor 102 comprises of an array of sensing electrodes and is operably fixed to capture multiple reflected fingerprint images. The sensor 102 can be a CCD (Charge Coupled Device), a CMOS (Complimentary Metal Oxide Semiconductor) or any type of optical sensor known in the art. The sensor 102 captures images of the fingerprint in the form of image data representing the intensity of the reflected light measured by the sensing electrodes. In one example, the sensor 102 may consists of a linear sensor array 202 (as illustrated in FIG. 2) with a plurality of pixels, such as 128×1 pixels rather than a two dimensional sensor array. Each pixel on the sensor 102 (both linear sensor array and two dimensional sensor array types) is a photosensor or other photosensitive device wherein each photosensor captures a picture element or pixel of the fingerprint image and all pixels of the sensor 102 are combined to form a complete image.

As illustrated in FIG. 1, the sensor 102 is located adjacent to a touch sensitive surface 101 and is coupled to a finger motion detector 104. The motion detector 104 determines the rate of the finger movement as the finger is slid over the touch sensitive surface 101 and subsequently enabling the image processor 105 to generate a processed fingerprint image 106 based on the portions of the fingerprint image captured by the sensor 102 in accordance with the rate of the finger movement determined through the touch sensitive surface 101. The image processor 105 may be a microprocessor, microcontroller or other processing device that is capable of processing the portions of the fingerprint image data and subsequently combining or stitching these images together to form a processed fingerprint image 106. The image processor 105 may further include a stitching algorithm to stitch or combine sequential portions of the fingerprint image to generate a processed fingerprint image 106. For example, the stitching algorithm uses the rate of the finger movement determined by the motion detector 104 to determine the overlap between successive portions of the fingerprint images taken during the time that the user's finger is slid across the touch sensitive surface. When two portions of fingerprint images are taken sequentially, the portion of the later image that overlaps the previous image can be overwritten and combined, this process is repeated for each subsequent image taken by the sensor 102 as the finger is slid over the touch sensitive surface 101 until a complete fingerprint image is obtained. Of course, the fingerprint sensing device 100 may also include a matching application such as fingerprint authentication system 110 for fingerprint identification and authentication purpose. The fingerprints sensing device 100 can be integrated as one single chip system, for example, the motion detector 104, image sensor 102 and image processor 105 can be all integrated as one single chip system. For some applications, from both cost and space perspectives, it is also possible to integrate a fingerprint navigation mechanism into the fingerprint sensing device 100 for providing both with fingerprint authentication and finger navigation.

An optical element 109 is coupled between the surface 101 and the light source 103 for directing the light emitted from the light source 103 onto the finger. The optical element is further coupled between the surface 101 and the sensor 102 for directing the reflected fingerprint images onto the sensor 102. Depending on the type and design of the optical element 109, the light emitted from the light source 103 can be directed towards the finger at any desirable angle that allows a sufficient reflection of the fingerprint image to be directed to the sensor 102. Likewise, the reflected fingerprint image can be directed towards the sensor 102 via optical element 109 at any angle that provides sufficient reflection of the fingerprint image. Another solution is to use a total internal reflection mechanism. Alternatively, the optical element 109 may include a lens or at least a light guide, for example a linear array light pipe 206 (as illustrated in FIG. 2). For a small portable handheld device with low z-height tolerance (the vertical distance), it is highly desirable to have a low profile optical element 109 with thickness of less than 2 mm. A truly low profile optical element 109 may be a fiber lens that can be fabricated onto a lens substrate by an etching process. Alternatively, some embodiments of the fingerprint sensing device 100 may not include any optical element 109.

FIG. 2 depicts a side view of one embodiment of a fingerprint sensing module 200 for use in a handheld device or other electronic device. In particular, FIG. 2 illustrates a low profile fingerprint sensing module 200 that is intended to be used in conjunction with a touch sensitive handheld device such as a cell phone or other personal electronic device. The illustrated low profile fingerprint sensing module 200 may be operatively mounted on a handheld device such as cell phone which has a touch sensitive surface 201 upon which users place or slide a finger. The fingerprint sensing module 200 includes the linear array sensor 202 (but a two dimensional array sensor may be used), a light source 203, a capacitive based motion detector 104, a low profile optical lens system 205 and an image processor 105. The fingerprint sensing module 200 is configured to be operably fixed directly adjacent to the touch sensitive surface 201 of the handheld device. In one embodiment, the fingerprint sensing module 200 is a low cost fingerprint sensing device comprising of a linear sensor array 202, wherein the linear sensor array 202 is configured to capture portions of the fingerprint image as the finger is slid over the linear sensor array 202. The linear sensor array 202 may consist of 128×1 pixels rather than a conventional two dimensional sensor array wherein such linear sensor array is sufficiently capable of capturing a portion of the fingerprint image as the finger is slid over the linear sensor array 202. Each pixel on the linear sensor array 202 is a photosensor or other photosensitive device whereby each photosensor syncronously captures a picture element or pixel of a portion of the fingerprint image. All pixels (or some portion thereof) are combined over time to from a processed fingerprint image 106 or a complete image. The linear sensor array 202 is sufficiently capable to effectively capture multiple portions of fingerprint images, wherein the portions of the fingerprint images are subsequently used to generate a useful fingerprint image.

The fingerprint sensing module 200 may be operatively coupled to a touch sensitive handheld device so as to take advantage of the ability of the touch sensitive screen of the handheld device to act as the finger motion detector 104 or the motion rate sensor. For that reason, it is feasible to use a linear sensor array 202 (e.g., 128×1 pixels) to capture only portions of the fingerprint images, and finally combining these portions of fingerprint images to form a fingerprint image for fingerprint authentication. Therefore, the substantial reduction in the number of pixel will lead to a lower product cost and a smaller form factor than when a two dimension array of pixels is used. These significant advantages and features of the fingerprint sensing module 200 position it to be a popular choice among small handheld devices. In particular, in some handheld devices, where the entire face of the device is glass or plastic, it is feasible to fit such a small form factor fingerprint sensing module 200 within any small slot on the handheld device. For example, it is possible to fit such fingerprint sensing module 200 beneath the glass surface. The fingerprint sensing module 200 can also be placed just below the base of the display within a tight foot print, and therefore the handheld device can still maintain its sleek look and be aesthetically appealing to the user. Of course, for a more sophisticated handheld device, the fingerprint sensing module 200 may also include a matching application for processing fingerprint identification and authentication purpose. The fingerprint sensing module 200 can be integrated as one single chip system, for example, the motion detector 104, linear sensor array 202 and image processor 105 can all be integrated as one single chip system.

The low profile optical lens system 205 may further include an IR lens 207 and a linear array light pipe 206. The IR lens 207 is configured to direct the light emitted from the light source 203 (from an IR LED) towards the finger and a liner array light pipe 206 is configured to reflect the fingerprint images onto the linear sensor array 202. Such low profile optical lens system 205 can be used in a small portable handheld device with low z-height tolerance. As shown in FIG.2, the linear sensor array 202, the light source 203, low profile optical lens system 205 and image processor 105 are operably attached to a substrate 206; the substrate 206 provides support and the necessary connectivity among all connected components. The substrate 206 may be a flexible circuit wherein the flexible circuit includes conductive traces to allow connectivity among all components attached therewith using conductive bonding material, and therefore indirectly eliminating all the limitations associated with a reflow process.

Figure 3:
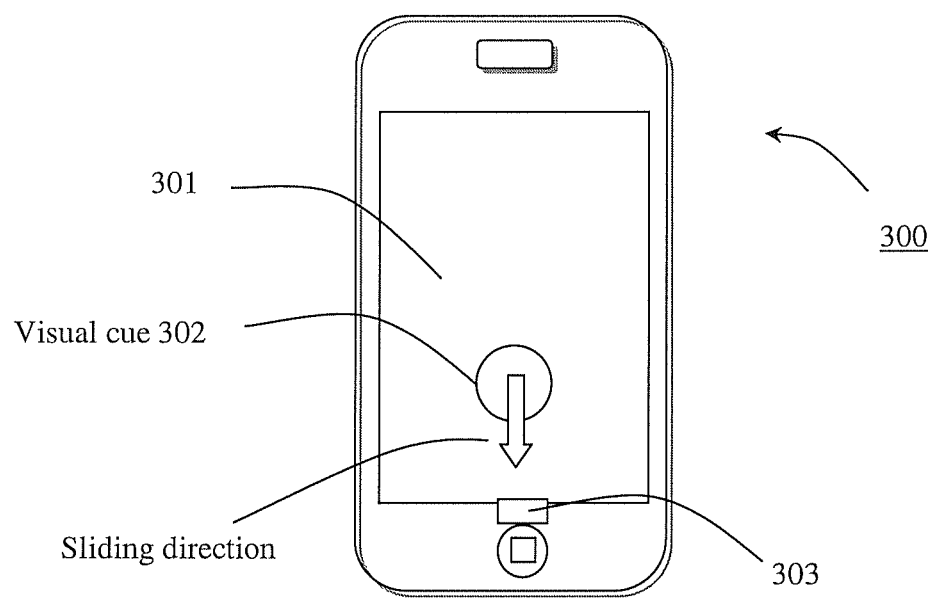
FIG. 3 shows one embodiment of the application of fingerprint sensing device on a handheld device.

FIG. 3 depicts a handheld device 300 with a touch sensitive surface 301 embodying an application of fingerprint sensing module 200 therein. An advantage of the fingerprint sensing module 200 is to make use of the ability of the touch sensitive screen of the handheld device for doubling as a finger motion detector or acting as the motion rate sensor. As a result the linear sensor array 202 of FIG. 2 can be utilized and further configured to capture only portions of the fingerprint images and finally combining these portions of fingerprint images to form a fingerprint image for fingerprint authentication. In particular, the linear sensor array 202 not only provides a lower cost solution but also a smaller and more compact form factor. In the preferred embodiment the sleek look of a touch sensitive handheld device can be maintained while increasing the robustness of the fingerprint sensing module 200. The fundamental concept of a fingerprint sensing device applies to both capacitive and optical imaging method but there appears to be some advantages to the preferred optical embodiment when used with touch sensitive handheld devices. One of the known handheld devices of this kind is Apple's i-Phone. For example, the entire face of the i-Phone is glass except for one slot for the earpiece and one hole for a button. For example, it is feasible to fix the fingerprint sensing device at the location 303 for the handheld device as illustrated in FIG. 3, just below the base of the display and underneath the glass. Therefore a very sleek and aesthetically appealing presentation of the device can be maintained. Such an approach is feasible with optical technology because the low profile optical lens system can be made to be the same thickness as the cover glass. An additional display of visual cue 302 which can assist the user in proper use of the sensor can also be implemented. For example, the visual cue 302 will assist the user where to place one's finger and how to slide one's finger against the sensor, however, in practice a better swiping result may be obtained by moving the handheld device and keeping the finger stationary. Additionally, the visual cue 302 display can also indicate a moving line or lines which show the desired swipe speed. Such cue can increase the likelihood of successful swipe and reducing user frustration.

Figure 4:
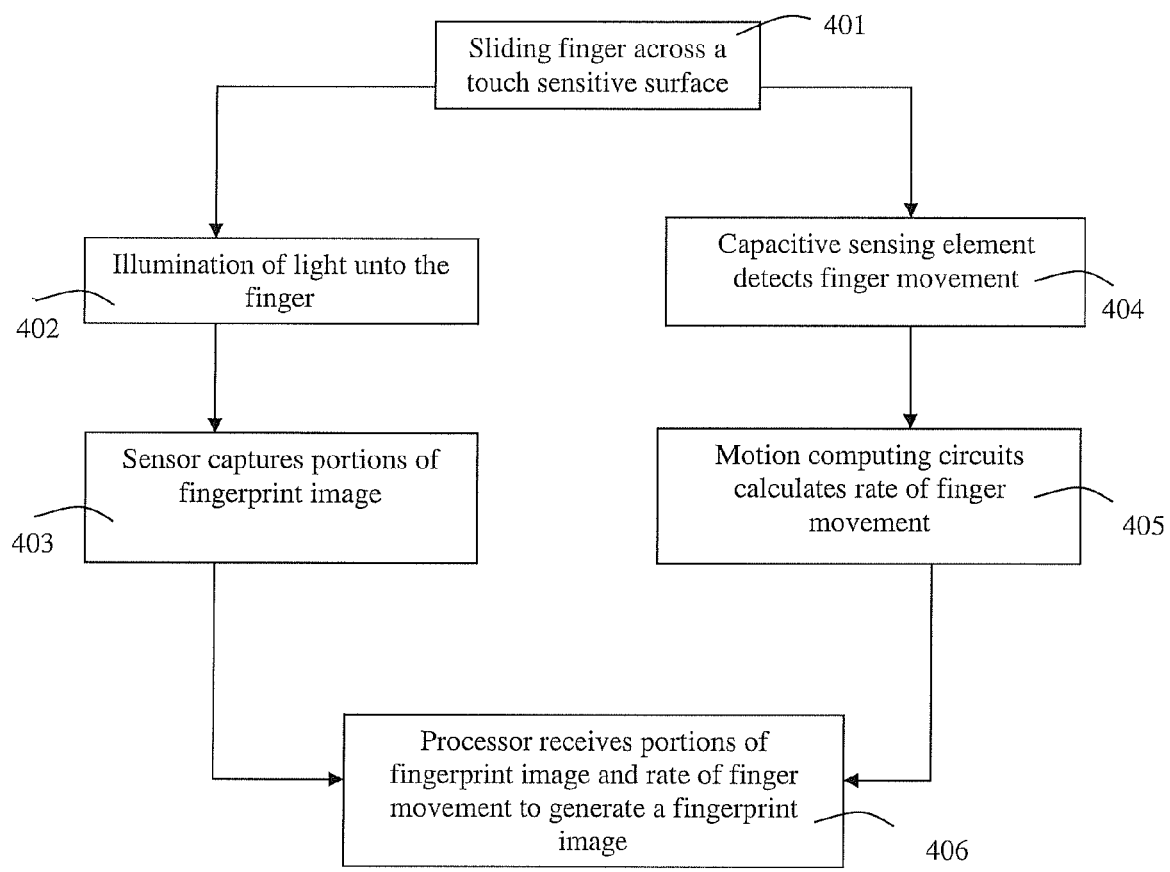
FIG. 4 is a flow chart of one embodiment of a method of fingerprint processing operation of a fingerprint sensing device.

FIG. 4 depicts a flow diagram of one embodiment of a method of a fingerprint processing operation of a fingerprint sensing device 100 or 200. Although the fingerprint sensing process is described in conjunction with a touch sensitive handheld device such as a cell phone, some embodiments of method may be implemented with other types of portable devices. At step 401, the fingerprint sensing operation initializes when the user's finger is slid across the touch sensitive surface of the handheld device. The fingerprint sensing device is configurable to capture a fingerprint image when the finger is slid over the touch sensitive surface and the sensor in any sliding direction or at a predetermined sliding direction. At step 402, the light source emits illumination light unto the finger when the finger is slid over the fingerprint sensing device. The light source can be any suitable source of electromagnetic radiation such as a light emitting diode (LED), and may include a coherent or non-coherent LED. The light source may include a single LED or multiple LEDs and the LED can be selected from any light range within the visible to non-visible light spectrum (e.g., an IR LED). In general, the wavelength and the intensity of the light emitted from the light source is selected to provide an optimum reflection of the fingerprint image from human skin (finger) and can be chosen based on the manufacturer's preferences. At step 403, the sensor captures successive portions of fingerprint image as the finger is slid over the sensor. In particular, the sensor may consist of a linear sensor array whereby the linear sensor array is sufficiently capable of capturing a portion of the fingerprint image as the finger is slid over the sensor. The sensor captures images of the fingerprint in the form of image data representing the intensity of the reflected light measured by the sensing electrodes. Each pixel on the linear sensor array is a photosensor or other photosensitive device whereby each photosensor captures a picture element or pixel of the fingerprint image and all pixels are combined to from the complete image. Of course, the sensor can also be a conventional two dimensional sensor array or other types of array formations.

At step 404, at the moment when the finger is slid over the touch sensitive surface of the handheld device as shown during step 401, the capacitive sensing element of the touch screen device detects the movement of the finger, including speed and direction, as the finger is slid over the capacitive sensing element. At step 405, the motion computing circuit calculates the rate of the finger's movement as the finger is slid over the capacitive sensing element of the touch screen device. The capacitive sensing element will sense the positions of the finger as the finger is slid across the capacitive element and the motion computing circuit will subsequently determine the movement of the finger based on the various positions for the finger that is in contact with the capacitive sensing element. At step 406, the image processor generates a fingerprint image by processing at least two portions of the fingerprint image captured by the sensor in accordance to the rate of the finger's movement over the touch screen device. For obtaining a high quality fingerprint image, many portions of the fingerprint image may be taken, for example, a typical application may take more than twenty images. The image processor receives the portions of the fingerprint images from the sensor in the same order as they are sensed by the sensor, and the finger movement information from the motion detector is carried with each portion of the fingerprint image to enable the subsequent generation of a processed fingerprint image in accordance with the finger movement determined by the motion detector, as illustrated in step 406. The image processor may include a stitching algorithm to stitch or combine sequential portions of the fingerprint image to generate a processed fingerprint image. The stitching algorithm uses the rate of the finger movement determined by the motion detector to determine the overlap between successive portions of the fingerprint images taken during the time that the user's finger is slid across the touch sensitive surface. For example, the image processor will read the images that were taken sequentially, overwrite the overlapping portions of these two images and stitch them together, this process is repeated for each subsequent image taken by the sensor as the finger is slid over the touch sensitive surface until a complete fingerprint image is obtained. Of course, the fingerprint sensing device may also include a matching application such as fingerprint authentication system 110 for fingerprint identification and authentication purpose as shown in FIG. 1. The fingerprints sensing device also can be integrated as one single chip system, for example, the motion detector, image sensor and image processor can be all integrated as one single chip system. For some applications, it is also possible to include a navigation mechanism into the fingerprint sensing device for providing both with fingerprint authentication and cursor navigation.

Although the operations of the method(s) herein are shown and described in a particular order, the operations order of each method may be altered so that certain operations may be performed in an inverse order or so that certain operations may be performed, at least in part, concurrently with other operations.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A fingerprint sensing module for a touch screen device, comprising:
    a substrate;
    a sensor having at least one linear sensor array attached to the substrate, the sensor being operable to capture portions of a fingerprint image as a finger is slid over the sensor;
    wherein the sensor is disposed adjacent to a perimeter edge of a touch screen of the touch screen device;
    a light source for illuminating an area of the finger;
    a motion detector comprised of a capacitive sensing element disposed within the touch screen of the touch screen device;
    wherein the motion detector is configured to detect finger movement as the finger is slid over an upper surface of the touch screen; and
    an image processor attached to the substrate and coupled to the sensor and the motion detector for processing at least two captured portions of the fingerprint image and further generating a processed fingerprint image in accordance with the finger movement determined by the motion detector;
    an optical lens system for directing light to the finger and for directing reflected light towards the sensor, wherein the optical element comprises a lens and a light guide that each has an upper surface that is co-planar with the upper surface of the touch screen.

2. The fingerprint sensing module of claim 1, wherein the light guide is a linear array light pipe for directing a reflection of the fingerprint image unto the sensor.

3. The fingerprint sensing module of claim 1, wherein the optical lens system comprises a low profile optical element having a z-height less than 2 mm.

4. The fingerprint sensing module of claim 1, wherein the optical lens system comprises a low profile optical element that is fabricated by an etching process.

5. The fingerprint sensing module of claim 1, wherein the optical lens system comprises a low profile optical element device comprised of a fiber lens.

6. The fingerprint sensing module of claim 1, wherein the motion detector further comprises a motion computing circuit coupled to the capacitive sensing element, wherein the motion computing circuit determines the finger movement or displacement as the finger is slid over the touch screen.

7. The finger sensing module of claim 1 wherein the sensor is disposed adjacent to a perimeter edge of the touch screen.

8. The fingerprint sensing module of claim 1, wherein the substrate is a flexible circuit.

9. A handheld communications device, comprising:
    a touch screen comprising an upper surface for sliding a finger thereacross and an apposed bottom surface;
    a substrate;
    a sensor attached to the substrate and disposed adjacent to a perimeter edge of the touch screen to capture portions of a fingerprint image as the finger is slid over the touch screen;
    a light source for illuminating an area of the finger,
    a motion detector comprised of a capacitive sensing element disposed within the touch screen wherein the motion detector is attached to the substrate and is configured to detect finger movement as the finger is slid over the touch screen; and
    an image processor coupled to the sensor and the motion detector for processing at least two captured portions of the fingerprint image and further generating a processed fingerprint image in accordance with the finger movement determined by the motion detector;
    an optical lens system for directing light to the finger and for directing reflected light towards the sensor, wherein the optical element comprises a lens and a light guide that each has an upper surface that is co-planar with the upper surface of the touch screen.

10. The handheld communications device of claim 9, wherein the touch screen is part of a housing of a portable electronic device comprising at least one of glass and plastic.

11. The handheld communications device of claim 9, wherein the sensor comprises at least one linear sensor array to capture portions of a fingerprint image as a finger is slid over the sensor.

12. The handheld communications device of claim 9, wherein the optical lens system is a low profile optical element having a z-height less than 2 mm.

13. The handheld communications device of claim 9, wherein the handheld communications device is configured to display a visual cue that assists a user where to place one's finger and how to slide one's finger across the optical lens.

14. The handheld communications device of claim 9, wherein the motion detector further comprises a motion computing circuit coupled to the capacitive sensing element, wherein the motion computing circuit determines a rate of the finger movement as the finger is slid over the touch screen.

15. A fingerprint sensing method for a touch screen device, comprising:
    emitting illumination light onto a finger as the finger is slid over a touch screen of the touch screen device, wherein the illumination is emitted from a light source that is dedicated to fingerprint sensing;
    capturing portions of a fingerprint image as the finger is slid over a sensor, said sensor being disposed adjacent to a perimeter edge of the touch screen;
    detecting a rate of movement of the finger as the finger is in contact with and moving over a capacitive sensing element of the touch screen device; and
    generating a finger print image by processing at least two portions of the fingerprint image captured by the sensor in accordance to a rate of the finger's movement over the touch screen device.

16. A fingerprint sensing method of claim 15, further comprising determining the rate of finger's movement by a motion computing circuit as the finger is in contact with the capacitive sensing element of the touch screen device.

17. A fingerprint sensing method of claim 15, further comprising processing at least two portions of the fingerprint image and subsequently combining portions of the fingerprint image into a complete fingerprint in accordance with the rate of the finger's movement.

* * * * *